US012167217B2

(12) United States Patent
Wilk et al.

(10) Patent No.: US 12,167,217 B2
(45) **Date of Patent: *Dec. 10, 2024**

(54) ELECTRO-ACOUSTIC TRANSDUCER DIAPHRAGM WITH INTEGRATED STRUCTURAL FEATURES, AND RELATED SYSTEMS AND METHODS

(71) Applicant: Apple Inc., Cupertino, CA (US)

(72) Inventors: Christopher Wilk, Los Gatos, CA (US); Jiahui Liang, Sunnyvale, CA (US); Rebecca J. Mikolajczyk, Santa Clara, CA (US)

(73) Assignee: Apple Inc., Cupertino, CA (US)

( * ) Notice: Subject to any disclaimer, the term of this patent is extended or adjusted under 35 U.S.C. 154(b) by 269 days.

This patent is subject to a terminal disclaimer.

(21) Appl. No.: 17/134,096

(22) Filed: Dec. 24, 2020

(65) Prior Publication Data

US 2021/0120344 A1 Apr. 22, 2021

Related U.S. Application Data

(62) Division of application No. 16/149,307, filed on Oct. 2, 2018, now Pat. No. 10,911,875.

(Continued)

(51) Int. Cl.
*H04R 9/06* (2006.01)
*H04R 7/16* (2006.01)

(Continued)

(52) U.S. Cl.
CPC ................. *H04R 9/06* (2013.01); *H04R 7/16* (2013.01); *H04R 9/025* (2013.01); *H04R 9/04* (2013.01);

(Continued)

(58) Field of Classification Search
CPC . H04R 7/04; H04R 7/16; H04R 9/025; H04R 9/04; H04R 9/041; H04R 9/045; H04R 9/046; H04R 9/06; H04R 2209/041
See application file for complete search history.

(56) References Cited

U.S. PATENT DOCUMENTS 4,322,584 A * 3/1982 Shimada ................ H04R 9/046 381/354
4,928,312 A 5/1990 Hill (Continued)

FOREIGN PATENT DOCUMENTS

CN 105681979 6/2016
CN 107113506 8/2017

OTHER PUBLICATIONS

Chinese Office Action from Chinese Patent Application No. 201910741922.0, dated Jun. 25, 2021, 7 pages including partial English language translation.

(Continued)

*Primary Examiner* — Huyen D Le
(74) *Attorney, Agent, or Firm* — BAKERHOSTETLER

(57) ABSTRACT

An electro-acoustic transducer has an acoustic diaphragm and a voice-coil. The diaphragm defines a first major surface. A flange extends from the diaphragm in a direction opposite the first major surface. The voice-coil has a first plurality of windings positioned adjacent to the acoustic diaphragm and a second plurality of windings positioned distally from the acoustic diaphragm. The flange overlaps the first plurality of windings. The flange and the windings can be adhesively bonded with each other to form a lap joint. The lap joint can transfer force from the voice-coil to the diaphragm.

20 Claims, 7 Drawing Sheets

Related U.S. Application Data

(60) Provisional application No. 62/725,103, filed on Aug. 30, 2018.

(51) Int. Cl.
*H04R 9/02* (2006.01)
*H04R 9/04* (2006.01)

(52) U.S. Cl.
CPC ............. *H04R 9/041* (2013.01); *H04R 9/045* (2013.01); *H04R 9/046* (2013.01); *H04R 2209/041* (2013.01)

(56) References Cited

U.S. PATENT DOCUMENTS

| | | | | |
|---|---|---|---|---|
| 5,012,890 | A | 5/1991 | Nagi | |
| 6,330,340 | B1 | 12/2001 | Proni | |
| 6,343,136 | B2 | 1/2002 | Tokusho | |
| 6,421,449 | B1 | 7/2002 | Hasegawa | |
| 6,621,912 | B2 | 9/2003 | Sugiyama | |
| 7,190,804 | B2 * | 3/2007 | Nakamura | H04R 9/04 381/403 |
| 7,306,073 | B2 | 12/2007 | Frasl | |
| 10,911,875 | B2 * | 2/2021 | Wiik | H04R 7/16 |
| 2001/0017928 | A1 | 8/2001 | Sugiyama et al. | |
| 2004/0264731 | A1 | 12/2004 | Nakamura et al. | |
| 2005/0286735 | A1 * | 12/2005 | Ikeuchi | H04R 1/023 381/391 |
| 2008/0023259 | A1 * | 1/2008 | Muto | H04R 7/20 181/151 |
| 2008/0080736 | A1 * | 4/2008 | Sumitani | H04R 9/06 381/407 |
| 2009/0041291 | A1 | 2/2009 | Toyofuku et al. | |
| 2009/0202100 | A1 | 8/2009 | Iino | |
| 2012/0263341 | A1 | 10/2012 | Stead | |

OTHER PUBLICATIONS

Chinese Office Action from Chinese Patent Application No. 202111058601.4, dated Feb. 28, 2024, 14 pages including English language translation.

* cited by examiner

24

ELECTRO-ACOUSTIC TRANSDUCER DIAPHRAGM WITH INTEGRATED STRUCTURAL FEATURES, AND RELATED SYSTEMS AND METHODS

CROSS-REFERENCE TO RELATED APPLICATIONS

The present application is a divisional of U.S. patent application Ser. No. 16/149,307, entitled "Electro-Acoustic Transducer Diaphragm with Integrated Structural Features, and Related Systems and Methods," filed Oct. 2, 2018, which claims the benefit of U.S. Provisional Patent Application Ser. No. 62/725,103, entitled "Electro-Acoustic Transducer Diaphragm with Integrated Structural Features, and Related Systems and Methods," filed Aug. 30, 2018, each of which is hereby incorporated by reference in its entirety for all purposes.

FIELD

This application and related subject matter (collectively referred to as the "disclosure") generally concern electro-acoustic transducers, and related systems and methods.

BACKGROUND INFORMATION

Electronic devices can include one or more electro-acoustic transducers to emit sound. Given size constraints, some electronic devices incorporate electro-acoustic transducers configured as so-called "micro-speakers." Examples of micro-speakers include a loudspeaker transducer found within an earphone, a headphone, a smart-phone, or other similar compact electronic device, such as, for example, a wearable electronic device, a portable time-piece, or a tablet-, notebook-, or laptop-computer.

SUMMARY

In some respects, concepts disclosed herein broadly concern electro-acoustic transducers, and more particularly, but not exclusively, loudspeaker transducers. More particularly, but not exclusively, this disclosure pertains to loudspeakers that include a diaphragm having integrated structural features, such as, for example, a pedestal suitable for lap-joining with a movable portion of an electric driver (e.g., a voice coil). As but one other illustrative example, a disclosed loudspeaker diaphragm can include one or more supplemental stiffeners, as to modify a break-up frequency mode of the diaphragm.

Some disclosed transducers include a diaphragm having integrated structural features that improve a physical robustness of the transducer. For example, some disclosed structures are suitable for improving a physical connection with a drive element. As well, some disclosed structural features can improve a physical robustness of the transducer and/or alleviate manufacturing defects. Such structural features can modify a break-up frequency, e.g., by moving a break-up frequency mode outside an audible frequency band. As a consequence, some disclosed electro-acoustic transducers can be driven through larger excursions and with more force than conventional electro-acoustic transducers, providing improved fidelity and louder playback compared to prior electro-acoustic transducers.

According to a first aspect, an electro-acoustic transducer includes an acoustic diaphragm defining a first major surface and an opposed second major surface. A pedestal extends transversely from the second major surface. The acoustic diaphragm and the pedestal form a unitary construct. The electro-acoustic transducer also includes a drive element. The pedestal and the drive element are positioned in an overlapping registration with each other.

The pedestal can define an outer surface and the voice-coil can define a corresponding inner surface. The electro-acoustic transducer can further include an adhesively bonded lap joint between the outer surface of the pedestal and the inner surface of the voice-coil.

The pedestal can define an inner surface and the voice-coil can define a corresponding outer surface. The electro-acoustic transducer can further include an adhesively bonded lap joint between the inner surface of the pedestal and the outer surface of the voice-coil.

The drive element can have a plurality of layers of an electrically conductive filament. The overlapping registration between the drive element and the pedestal can include an overlapping relationship between the pedestal and the plurality of layers of the electrically conductive filament. In some instances, the drive element extends from a proximal end positioned adjacent the acoustic diaphragm to a distal end spaced apart from the acoustic diaphragm. The plurality of layers in overlapping relationship with the pedestal can include a first plurality of layers positioned adjacent the proximal end of the drive element. The drive element can further include a second plurality of layers of the electrically conductive filament.

The voice-coil of some disclosed electro-acoustic transducers can extend longitudinally from a proximal end positioned adjacent the acoustic diaphragm to a distal end spaced apart from the acoustic diaphragm. The overlapping registration between the voice-coil and the pedestal can include an overlapping relationship between the pedestal and the proximal end of the voice-coil.

The overlapping registration between the voice-coil and the pedestal can further include an adhesive bond between the pedestal and the voice-coil.

According to another aspect, an electro-acoustic transducer includes an acoustic diaphragm defining a first major surface and an opposed second major surface. Each of the first major surface and the opposed second major surface defines a corresponding major axis and a minor axis. Each respective major axis is longer than the corresponding minor axis. The electro-acoustic transducer includes a pedestal extending transversely from the second major surface, and a drive element. The electro-acoustic transducer also includes an adhesively bonded lap joint between the drive element and the pedestal.

The acoustic diaphragm and the pedestal can form a unitary construct.

The acoustic diaphragm can define an outer periphery. The pedestal can extend from the second major surface at position adjacent the outer periphery.

The acoustic diaphragm can define an outer periphery and the lap joint can be positioned inwardly of the outer periphery.

The electro-acoustic transducer can further include a stiffener extending from the first major surface and along the acoustic diaphragm toward the outer periphery. Such a stiffener can be integrally formed with the diaphragm. Such a stiffener can include an elongate rib having a longitudinal axis and defining a cross-sectional area. The cross-sectional area can taper along the longitudinal axis and toward the outer periphery. A stiffener can modify a break-up frequency mode of the diaphragm.

According to yet another aspect, an electro-acoustic transducer can include an acoustic diaphragm defining a first major surface and a flange extending opposite the first major surface. A voice-coil has a first plurality of windings positioned adjacent to the acoustic diaphragm and a second plurality of windings positioned distally from the acoustic diaphragm. The flange overlaps the first plurality of windings.

The electro-acoustic transducer can include an adhesive bond between the flange and the first plurality of windings.

The first plurality of windings can have fewer windings than the second plurality of windings such that the first plurality of windings is thinner than the second plurality of windings.

The first major surface can define a major axis and a minor axis.

The electro-acoustic transducer can also include a transducer chassis and a surround member extending from the chassis to the acoustic diaphragm. The acoustic diaphragm can also defines a boss extending from the first major surface at a position adjacent the surround member.

Also disclosed are associated methods, as well as audio appliances and audio accessories that incorporate disclosed electro-acoustic transducers.

The foregoing and other features and advantages will become more apparent from the following detailed description, which proceeds with reference to the accompanying drawings.

BRIEF DESCRIPTION OF THE DRAWINGS

Referring to the drawings, wherein like numerals refer to like parts throughout the several views and this specification, aspects of presently disclosed principles are illustrated by way of example, and not by way of limitation.

In FIG. 9, the upper major surface is shown and aspects of the pedestal extending below an opposed lower major surface are shown in relief.

DETAILED DESCRIPTION

The following describes various principles related to electro-acoustic transducers, and related systems and methods. For example, some disclosed principles pertain to structural features of electro-acoustic transducers that modify structural robustness of a transducer diaphragm compared to prior diaphragms. That said, descriptions herein of specific transducer, appliance, apparatus or system configurations, and specific combinations of method acts, are but particular examples of contemplated transducers, appliances, components, systems, and methods chosen as being convenient illustrative examples of disclosed principles. One or more of the disclosed principles can be incorporated in various other combinations to achieve any of a variety of corresponding, desired characteristics. Thus, a person of ordinary skill in the art, following a review of this disclosure, will appreciate that transducers, appliances, components, systems, and methods having attributes that are different from those specific examples discussed herein can embody one or more presently disclosed principles, and can be used in applications not described herein in detail. Such alternative embodiments also fall within the scope of this disclosure.

I. Overview

Some disclosed electro-acoustic transducers incorporate one or more selected structural features suitable for micro-speakers. For example, such structural features can provide micro-speakers with improved structural robustness, audio fidelity, long-term reliability, or other enhancements, compared to prior electro-acoustic transducers. Such structural features can include one or more protrusions from one or both major surfaces of a diaphragm. Similarly, such structural features can include one or more grooves, channels, conduits, apertures or other recesses formed in one or both major surfaces.

II. Electro-Acoustic Transducers

Figure 1:
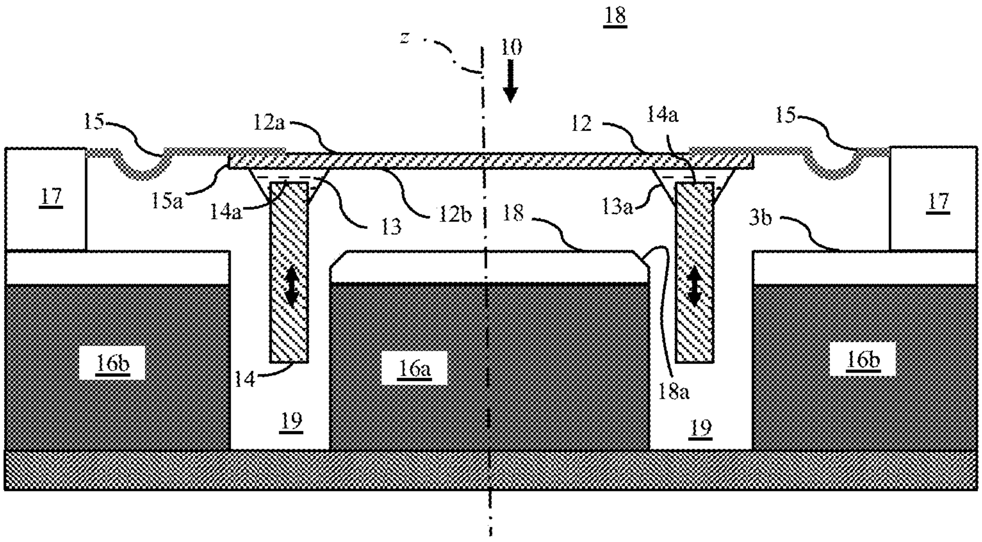
PRIOR ART FIG. 1
FIG. 1 illustrates aspects of an electro-acoustic transducer.

Referring to the cross-sectional view in FIG. 1, an electro-acoustic transducer 10 can have an acoustic radiator (e.g., a diaphragm) 12 physically coupled with an electrically drive element 14. The acoustic radiator defines a first major surface 12*a* and an opposed major surface 12*b*, both of which extend into and out of the page as shown in FIG. 1.

The drive element 14 can include a bobbin or other member combined with one or more windings of, e.g., an electrically conductive filament. In one aspect, the drive element is formed as a laminated construct, with each layer having a corresponding winding. In another aspect, the drive element does not include a bobbin, but rather is formed from laminated windings of a filament. The drive element 14 can have an annular or an elongated shape to yield a cross-section as depicted in FIG. 1. The conductive wire (e.g., copper clad aluminum) is sometimes referred to as a "voice coil wire." Such a bobbin is sometimes referred to in the art as a "voice-coil former" or "former," and the one or more windings is sometimes referred to in the art as a "voice-coil" or "coil."

The voice coil former (or the voice coil, when the former is omitted) can be physically attached, e.g., bonded, to the major surface 12*b* of the acoustic diaphragm 12. For example, a first end of the voice coil 14 can be chemically or otherwise physically bonded to the second major surface 12*b* of the acoustic diaphragm 12. The bond can provide a platform for transmitting mechanical force and mechanical stability to the diaphragm 12. Such mechanical force can be generated between a voice coil and a surrounding magnet.

As an example, the drive element 14 can be positioned in a gap between one or more permanent magnets 16*a*, 16*b* (e.g., an NdFeB magnet) such that the member 14 is immersed in a static magnetic field generated by the one or more magnets. An electrical current can pass through the coil and induce a corresponding magnetic field. The induced magnetic field from the coil can interact with the static magnetic field of the magnets 16*a*, 16*b* to urge the coil, and thus the diaphragm 12 to which the drive element 14 is attached, to move.

As the electric current varies in strength and direction, the magnitude of the magnetic forces urging the electrically drive element 14 can vary in magnitude and direction, thus causing the electrically drive element to reciprocate, e.g., as a piston. Such reciprocation is indicated by the double-ended arrows overlying the drive element 14. Further, a physical connection 13 between the drive element 14 and the acoustic diaphragm 12 can transmit a reciprocating, pistonic movement of the drive element to the diaphragm. As the respective current or voltage potential alternates, e.g., at an audible frequency, the voice coil 14 (and diaphragm 12) can move, e.g., reciprocate pistonically, and radiate sound.

The transducer module 10 has a frame 17 and a suspension system 15 supportively coupling the acoustic diaphragm 12 with the frame. The diaphragm 12 can be stiff (or rigid) and lightweight. Ideally, the diaphragm 12 exhibits perfectly pistonic motion. The diaphragm, sometimes referred to as a cone or a dome, e.g., in correspondence with its selected shape, may be formed from aluminum, paper, plastic, composites, or other materials that provide high stiffness, low mass, and are suitably formable during manufacture.

The suspension system 15 generally provides a restoring force to the diaphragm 12 following an excursion driven by interactions of the magnetic fields from the driven voice-coil member 14 and the magnet(s) 16*a*, 16*b*. Such a restoring force can return the diaphragm 12 to a neutral position, e.g., as shown in FIG. 1. The suspension system 15 can maintain the voice coil in a desired range of positions relative to the magnet(s) 16*a*, 16*b*. For example, the suspension 15 can provide for controlled axial motion along an axis, z, transverse to the diaphragm 12 (e.g., pistonic motion) while largely preventing lateral motion or tilting that could cause the drive element 14 to strike other motor components, such as, for example, the magnet(s) 16*a*, 16*b* or a member affixed to one of the magnets. As used herein, reference to a "magnet" means a magnet or a magnet assembly. A magnet assembly, in turn, may include a magnet physically coupled with, for example, another member or a coating. For example, a steel plate or other magnetic conductor can be affixed to a magnet to form a magnet assembly.

A measure of resiliency (e.g., a position-dependent stiffness) of the suspension 15 can be chosen to match a force vs. deflection characteristic of the motor system (e.g., the voice coil and magnets 16*a*, 16*b*). The illustrated suspension system 15 includes a surround extending outward of an outer periphery 15*a* of the diaphragm 12. The surround member can be formed from a polyurethane foam material, a silicone material, or other pliant material. In some instances, the surround may be compressed into a desired shape by heat and pressure applied to a material in a mold or die, for example.

A connection 13 between the drive element 14 and the diaphragm 12 may involve attaching an edge 14*a* of the drive element to the second major surface 12*b*, e.g., a flat region defined by the second major surface 12*b*. However, such a bond may be relatively weak, largely due to a relatively small contact area between the edge 14*a* of the drive element and the second major surface 12*b* of the diaphragm. Consequently, fillets 13*a* may be formed to strengthen the connection 13.

However, fillets 13*a* occupy a finite volume apart from the driven element 14 and diaphragm 12, and many commercially desirable electronic devices are quite small. Consequently, other components, e.g., the permanent magnet 16*a*, may be complementarily contoured, as to prevent interference between the fillet 13*a* and the magnet 16*a* during excursions of the diaphragm 12. As shown in FIG. 1, a top surface 18 of the magnet 16*a* has a chamfer 18*a* contoured in correspondence with the fillet 13*a*, as to prevent interference of the fillet with the magnet 16*a* during a "downward" diaphragm excursion. Forming such a chamfer 18*a* can, in some instances, require secondary machining or other processing.

Further, a loudspeaker diaphragm 12 can buckle or resonate when driven with sufficient force and/or at certain, e.g., resonant, frequencies. Such buckling or resonating is sometimes referred in the art as "break up" and can occur at certain "break-up mode" frequencies. Such break-up buckling or resonating can degrade fidelity of the loudspeaker and reduce reliability of the connection 13. Accordingly, given their limited physical size and structural features (e.g., the joint 13), output levels attainable by a micro-speaker as in FIG. 1 may be limited.

Figure 2:
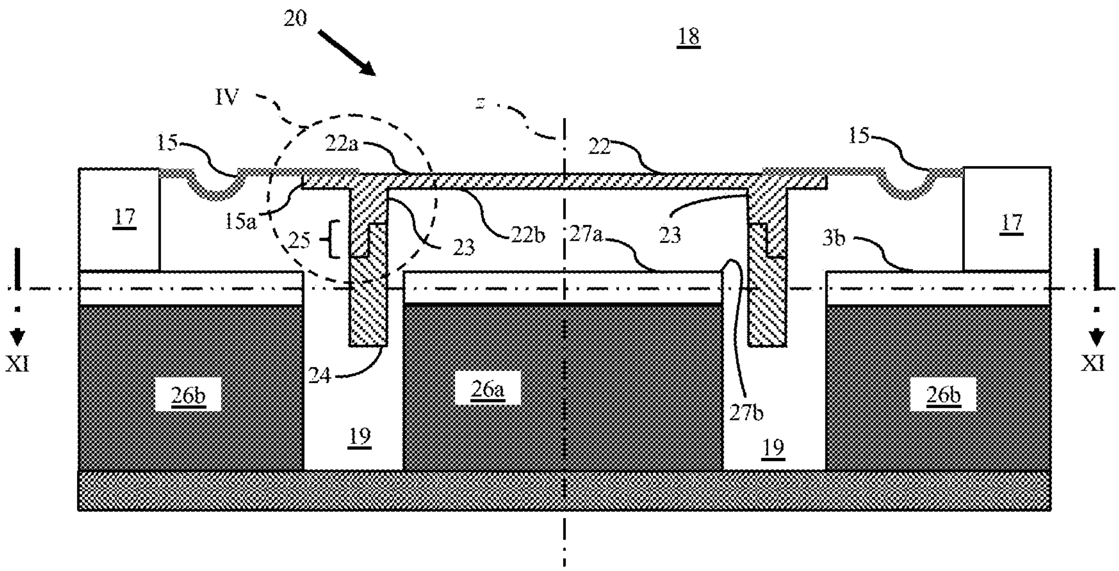
FIG. 2 illustrates aspects of another electro-acoustic transducer having a diaphragm with one or more integrated structural features.

Referring now to FIG. 2, an improved electro-acoustic transducer can have a diaphragm 22 defining a first major surface 22*a* and an opposed second major surface 22*b*. As with the transducer shown in FIG. 1, the transducer shown in FIG. 2 can include a drive element 24 (e.g., a voice-coil member) physically coupled with the diaphragm 22, and the drive element 24 can have a voice coil immersed in a static magnetic field, e.g., associated with the magnets 26*a*, 26*b*. And, as in FIG. 1, the diaphragm 22 can be coupled to a frame by way of the suspension system 15.

However, unlike the transducer in FIG. 1, a pedestal 23 (or flange) can extend from the second major surface 22*b* of the diaphragm 22. The pedestal 23 can be suitable for lap-joining the diaphragm 22 with the movable drive element 24. Some unitary diaphragm/pedestal members are formed using an injection-molding process. Injection-molding processes can provide flexibility and form a wide variety of integrated structural features in a unitary, acoustic diaphragm. Some representative structural features are described in detail below.

Figure 3:
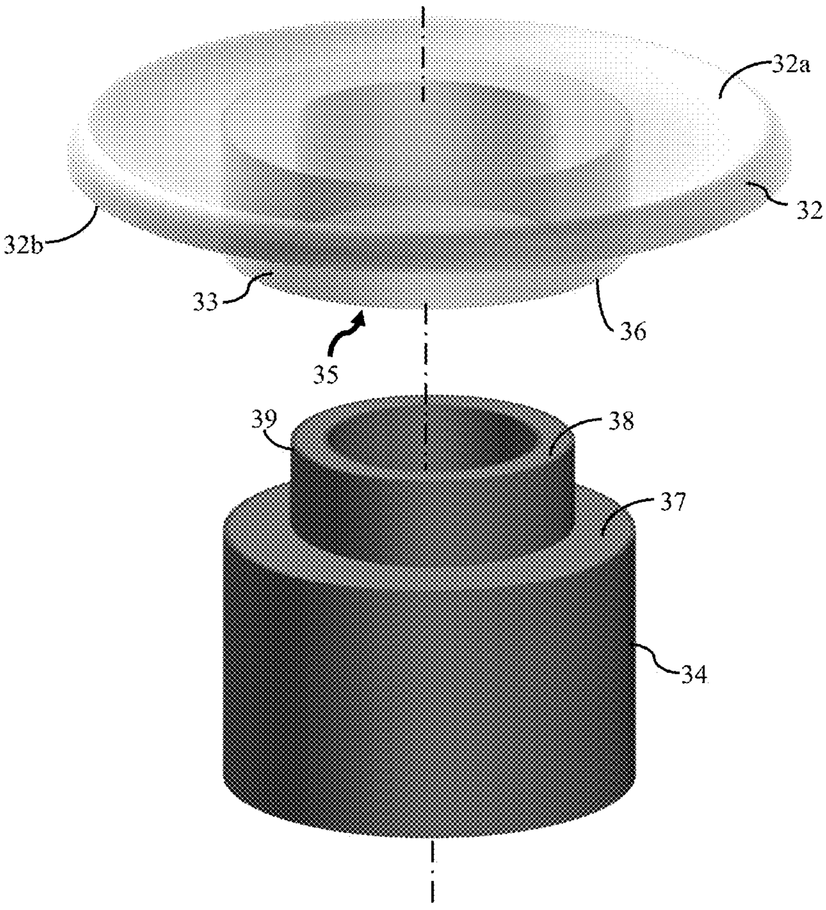
FIG. 3 illustrates an exploded view of a diaphragm and drive-member assembly.

The exploded view in FIG. 3 illustrates aspects of a lap joint between a diaphragm 32 and a drive element 34 similar to that shown in FIG. 2. In FIG. 3, the diaphragm 32 and a pedestal 33 form a unitary construct. The pedestal 33 extends from the second major surface 32*b* to a distal face 36, and defines a recessed inner region 35. The drive element 34 defines a shoulder 37 and a proximal end face 38. A shear face 39 extends from the shoulder 37 to the proximal end face 38. The pedestal 33 and the drive element 34 can be positioned in an overlapping registration with each other such that the proximal end face 38 of the driven element 34 can be received in the recessed inner region 35 of the pedestal 33. Such registration between the diaphragm and the drive element can facilitate assembly of an electro-acoustic transducer, as by aligning the diaphragm and the drive element with respect to each other. As well, such alignment can improve concentricity of the components and improve audio fidelity of the resulting loudspeaker transducer. For example, properly aligned drivers and diaphragms can maintain a higher degree of pistonic motion as the diaphragm is driven through excursions. It should be noted that although a shoulder 37 is depicted, the wall defining the shear face 39 can extend longitudinally uninterrupted to a distal end of the drive element 34, eliminating the shoulder 37.

Figure 4:
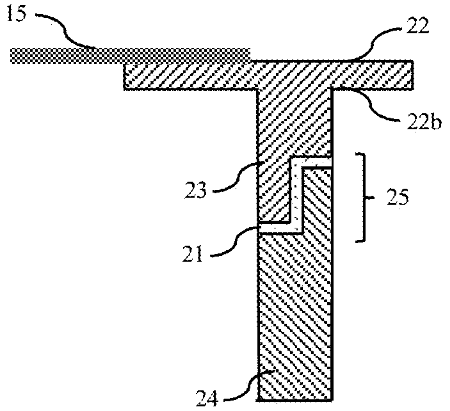
FIG. 4 schematically illustrates detail of the electro-acoustic transducer within the dashed circle "IV" shown in FIG. 2.

Additional aspects of connections between diaphragms and drive elements are described below. For example, FIG. 4 illustrates detail in the dashed circle "IV" shown in FIG. 2. As shown the pedestal 23 can extend from a proximal end adjoining (e.g., being integrally formed with) the second major surface 22*b* of the diaphragm 22 to define a unitary diaphragm-and-pedestal construct. A distal region of the pedestal 23 can (but need not) define a contour that is complementarily shaped relative to a corresponding proximal end of the drive element 24 (sometimes also referred to as a driver). The pedestal 23 and the drive element 24 can be positioned in an overlapping registration with each other, and the lap joint 25 can include an adhesive 21 spanning a gap between the pedestal 23 and the driver 24.

Figure 5:
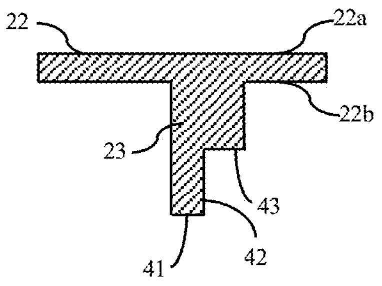
FIG. 5 illustrates aspects of the diaphragm shown in FIG. 4.
Figure 6A:
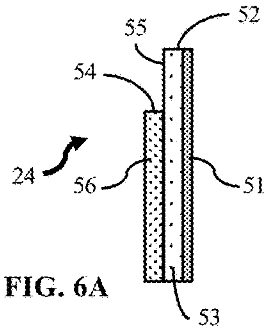
FIG. 6A schematically illustrates aspects of a drive element as in FIG. 4.
Figure 6B:
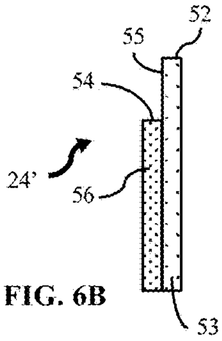
FIG. 6B schematically illustrates aspects of another configuration of a drive element as in FIG. 4.

As an example, by way of reference to FIGS. 5, 6A and 6B, the distal region of the pedestal 23 can define a stepped region, and the proximal region of the driver 24 can define a complementary stepped region. For example, a portion of the pedestal 23 can be recessed from a distal end face 41 to define a shoulder 43. An inwardly facing (e.g., relative to the inner magnet 26*a*) shear face 42 can span the distance from the distal end face 41 to the shoulder 43. Similarly, the drive element 24 can define a proximal face 52 and a shoulder 54. An outwardly facing shear face 55 can span the distance from the proximal end face 52 to the shoulder 54. When joined to form the lap joint 25 shown in FIG. 4, the proximal face 52 of the driver 24 can be positioned in an opposed relation to the shoulder 43 of the pedestal 24. Similarly, the shear face 42 of the pedestal can be positioned in an opposed relation to the shear face 55 of the driver 24. And, the distal end face 41 of the pedestal 23 can be positioned in opposed relation to the shoulder 54 of the driver 24.

An adhesive 21 (FIG. 4), e.g., a thermally sensitive adhesive, a curable expoxy, or another suitable adhesive material, can fill a gap between the faces and shoulders of the pedestal and driver to form a lap joint 25. Such a lap joint can bond the pedestal 23 with the driver 24.

FIGS. 6A and 6B show detail lacking from the cross-sectional views in FIG. 2. As noted above and shown in FIG. 6A, a bobbin 51 can support one or more windings of an electrically conductive filament. In FIGS. 6A and 6B, the illustrated drivers 24, 24' have a first winding region 53 and a second winding region 56. The first winding region 53 extends from a proximal end face 52 of the driver 24 to an opposed distal end of the driver. By contrast, the second winding region 56 extends from the shoulder 54 to the opposed distal end of the driver 24, leaving a region of the first winding region 53 exposed to define the shear face 55. The first winding region 53 can have any positive number of windings. The second winding region 56 can have any selected number of windings, including zero windings. The drive element 24 in FIG. 6 includes a bobbin (or coil former) 51 and the drive element 24' in FIG. 6A omits the bobbin 51. In FIG. 6A, the windings forming the coil form a laminated construct having sufficient stiffness as not to require a bobbin.

Figure 7:
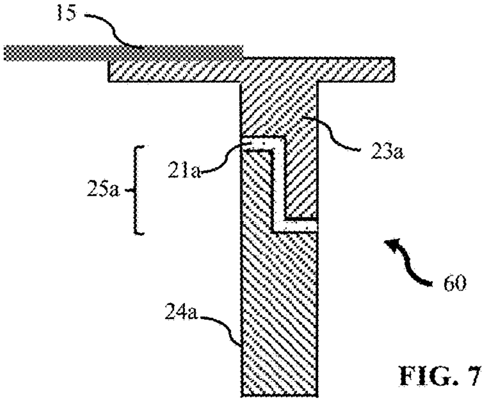
FIG. 7 schematically illustrates an alternative arrangement to the diaphragm-and-drive assembly shown in FIG. 4.

Alternative arrangements of the diaphragm, 22, the pedestal 23 and the drive element 24 also are possible. For example, although the pedestal 23 in FIGS. 4 and 5 is shown as defining an inwardly facing shear face 42, a pedestal 23*b* (FIG. 7) can define an outwardly facing shear face. Similarly, a drive element 24*a* (FIG. 7) can define an inwardly facing shear face to form an alternative lap joint 25*b* in an alternative arrangement 60.

Figure 8:
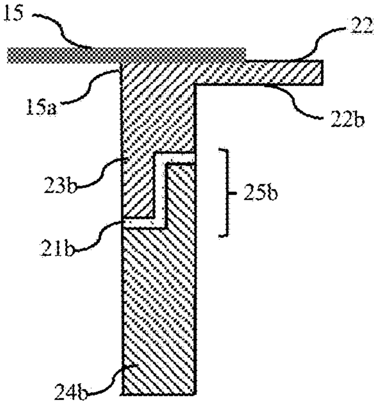
FIGS. 8 through 10 illustrate other alternative configurations of a diaphragm-and-drive assembly.
Figure 9:
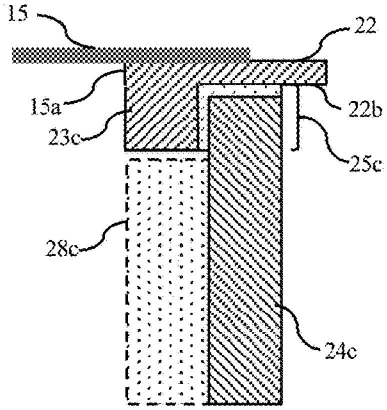
Figure 10:
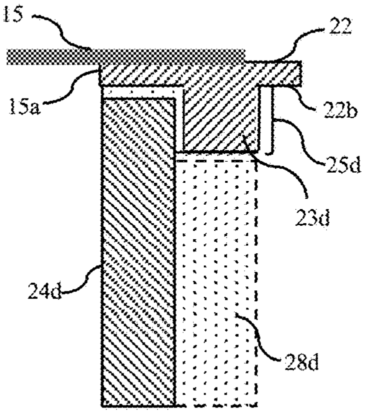

FIGS. 8 through 10 show other possible arrangements. In FIG. 8, the pedestal 23*b* is repositioned relative to the diaphragm 22 (compared to the position of the pedestal 23 in FIGS. 4 and 5). More particularly, the pedestal 23*b* in FIG. 8 adjoins and extends downwardly from an outer peripheral edge 15*a* of the diaphragm 22. FIG. 9 shows a similar position for the pedestal 23*c*. However, as shown in FIG. 9, the recessed region of the pedestal 23 (FIGS. 5 and 8) defining the shoulder 43 has been omitted from the lap joint 25*c*. Instead, in FIG. 9, the lap joint 25*c* is between an inwardly facing shear face of the pedestal 23*c* adhesively bonded with a corresponding outwardly facing shear face of the drive element 24*c*. That shear face of the pedestal 23*c* is defined not by a recessed region formed on the pedestal but rather by an inwardly facing major face of the pedestal 23*c*.

In FIG. 10, the pedestal 23*d* is positioned inwardly of the outer periphery 15*a* of the diaphragm 22, and the shear face of the pedestal 23*d* is an outwardly facing major face of the pedestal (though the shear face could be positioned on an inwardly facing major surface of the pedestal 23*d*, as in FIG. 9). Referring still to FIG. 10, the lap joint 25*d* between the drive element 24*d* and the pedestal 23*d* still arises from an overlapping relation between the pedestal and the drive element 24*d*. However, the drive element 24*d* is positioned outward of the pedestal 23*d* and is shown generally being coextensive with the outer peripheral edge 15*a* of the diaphragm 22. As a matter of design choice, the drive element 24*d* may be positioned inwardly of that edge 15*a* or may extend outwardly of the edge 15*a*. In FIG. 10, an outwardly facing major surface of the pedestal 23*d* is adhered to an inwardly facing surface of the drive element 24*d*.

As indicated in FIG. 9, the drive element may optionally include a winding region 28*c* positioned outwardly of the inwardly facing shear face of the pedestal 23*c*, as to define a stepped proximal end (relative to the diaphragm 22) for the drive element 24*c*. For example, the winding region 28*c* may include additional layers of windings compared to the region 24*c*. The lap joint 25*c* can optionally include an adhesive in the gap between the optional winding region 28*c* and the pedestal 23*c*. As indicated in FIG. 10, the drive element 24*d* may optionally include a winding region 28*d* positioned inwardly of the outwardly facing shear face of the pedestal 23*d*, as to define a stepped proximal end (relative to the diaphragm 22) for the drive element 24*d*. The winding region 28*d* may include additional layers of windings compared to the region 24*d*. Of course, either drive element 24*c*, 24*d* can optionally include a winding region that extends outwardly of the outer peripheral edge 15*a*. And, either or both drive elements 24*c*, 24*d* may include or omit a bobbin, as with the alternatives shown and described in relation to FIGS. 6 and 6A. In any event, a lap joint as described above can place the adhesive bond between the pedestal and the corresponding driver predominantly or entirely in shear, and can increase a surface area available for an adhesive bond between the diaphragm and the driver (e.g., the voice-coil, the voice-coil former, or both) compared to prior edge bonds 13 (with or without a reinforcing fillet 13*a*) as in FIG. 1. By increasing the strength of the joint between the drive element and the diaphragm, the voice-coil can reliably apply increased forces to the diaphragm as compared to forces applied to a diaphragm 12 through an edge-bond 13.

Still further, a lap joint can reduce or eliminate the need to create an adhesive fillet 13*a* in an edge bond 13 between the voice-coil (or former) and the diaphragm. With no, or at least a smaller, fillet, more room is made available for other components (e.g., magnets 26*a*, 26*b*). By providing additional packaging volume for, e.g., magnets, acoustic performance can increase and fewer secondary machining or other processing operations, e.g., on the magnets, are necessary to accommodate conventional fillets. For example, in FIG. 2, the top surface 27*a* of the magnet 26*a* has a raw edge 27*b* that does not need a chamfer to avoid interference with the lap joint 25, unlike the magnet 16*a*, which needs a chamfer 18*a* to avoid interference with the fillet 13*a* of the joint 13 (FIG. 1).

Figure 11:
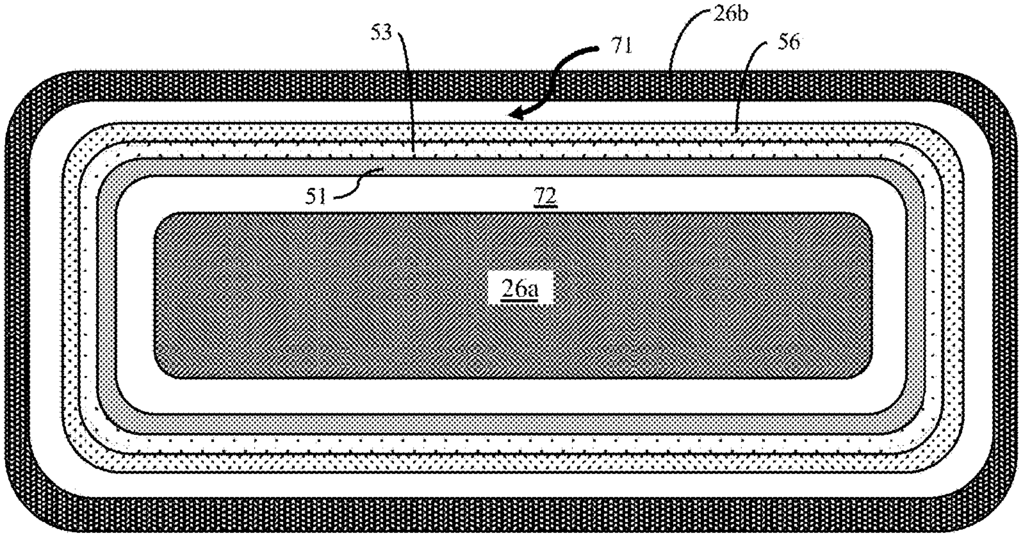
FIG. 11 illustrates a cross-sectional view taken alone section line XI-XI in FIG. 2.

As shown in FIG. 11, placement of the drive element 24 between the inner magnet 26*a* and the outer magnet 26*b* can leave an air gap 71 between the drive element and the outer magnet, as well as an air gap 72 between the drive element and the inner magnet 26*a*. In FIG. 11, the drive element 24 is illustrated as having a bobbin 51 as in FIG. 6 such that the air gap 72 is positioned between the bobbin 51 and the inner magnet 26*a*. In an operable embodiment, however, each winding region 53, 56 has two layers of windings and the bobbin 51 is omitted, as shown in FIG. 6A. Other embodiments have any selected number of winding layers.

With that configuration (FIG. 6A), the air gap 72 can extend between the winding region 53 and the inner magnet 26*a*. With each configuration of the drive element 24, 24' shown in FIG. 6 and FIG. 6A, a shear face of the pedestal extending from the diaphragm can be positioned in an overlapping relation to a portion 55 of the winding region 53. An adhesive material (e.g., glue) can physically couple the overlapping faces of the pedestal and the drive element to form the lap joint.

A design choice from among the various alternative lap joints between the drive element and the integrated diaphragm and pedestal can be made. Such a design choice may be selected to provide a suitable tradeoff among bond strength of the respective lap joint, motive force that can be generated by interactions between the magnetic flux generated by the winding regions 53, 56 and the magnets 26*a*, 26*b*, and overall available packaging volume (e.g., compared to a volume occupied by the various members of the electro-acoustic transducer).

Figure 15:
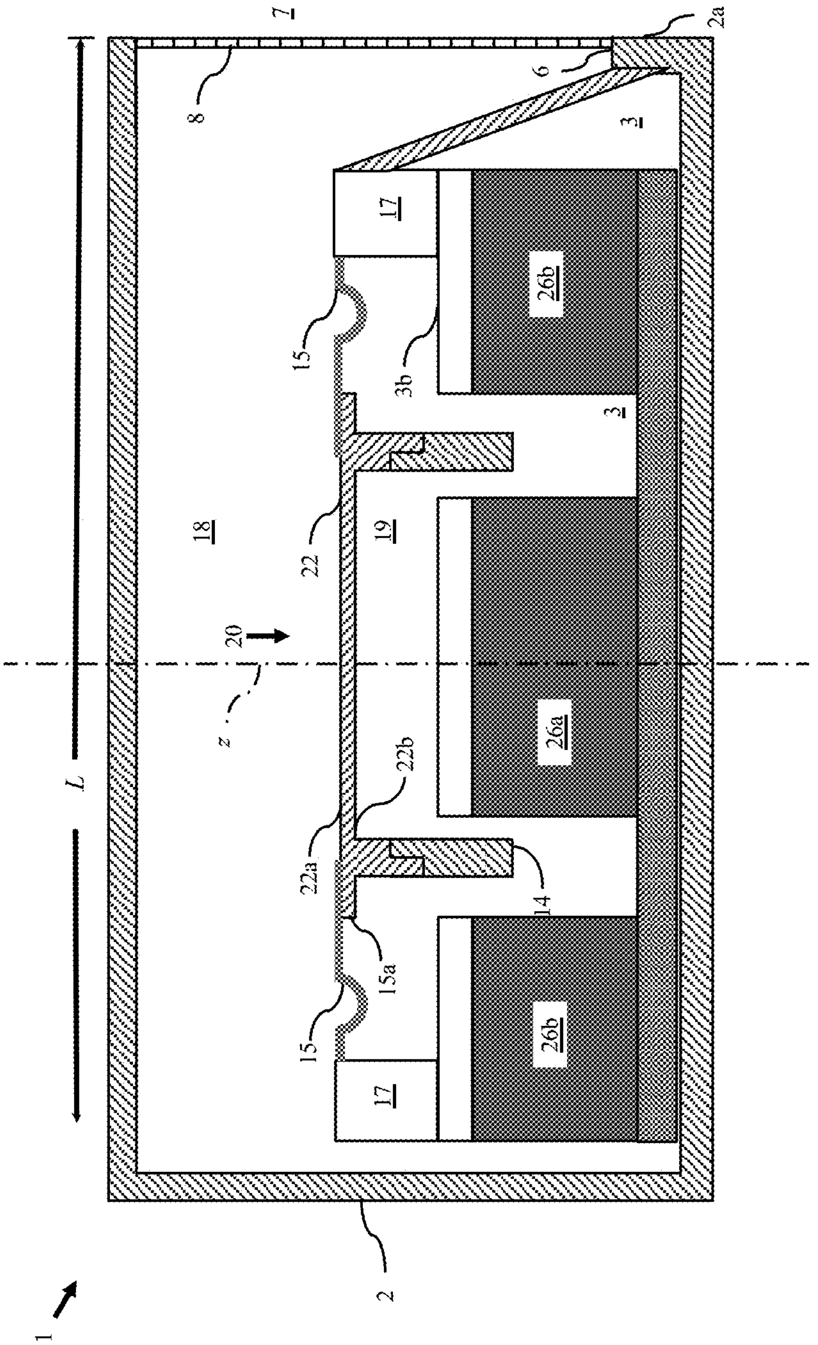
FIG. 15 illustrates aspects of the electro-acoustic transducer shown in FIG. 2 assembled with an acoustic enclosure.

In other respects, the electro-acoustic transducer 20 in FIG. 2 is similar to the transducer 10 shown in FIG. 1. For example, each transducer 10, 20 has a frame (or chassis) 17 and a suspension system including a surround 15 that suspends the respective diaphragm 12, 22 from the chassis 17. For example, the surround 15 can overlap with and be connected with a peripheral region 15*a* of the respective diaphragm 12, 22. The transducers 10, 20 can define a back region 19 bounded in part by each respective second major surface 12*b*, 22*b*. Similarly, each transducer 10, 20 can emit sound to a surrounding front region 18 partially bounded by each respective first major surface 12*a*, 22*a*. Some electronic devices acoustically couple such a micro-speaker with one or more open regions suitable for improving radiated sound, as in the nature of an acoustic chamber 30 (FIG. 15).

The voice coil/pedestal assembly 23, 24 can have a cross-sectional shape corresponding to a shape of the major surface of the diaphragm 22. For example, the diaphragm 22 can have a substantially circular (e.g., as in FIG. 3), rectilinear (e.g., as in FIG. 11), ovular, race-track or other shape when viewed in plan from above (or below). Similarly, the voice coil (or voice coil former) can have a substantially circular, rectilinear, ovular, race-track or other cross-sectional shape. In other instances, the cross-sectional shape of the voice coil former can differ from a shape of the diaphragm when viewed in plan from above (or below).

In general, a diameter or major axis (e.g., they-axis in FIG. 12) of a non-circular micro-speaker diaphragm can measure, for example, between about 3 mm and about 75 mm, such as between about 15 mm and about 65 mm, for example, between about 20 mm and about 50 mm. A minor axis (e.g., the x-axis in FIG. 12) of a non-circular micro-speaker diaphragm can measure, for example, between about 1 mm and about 70 mm, such as between about 3 mm and about 65 mm, for example, between about 10 mm and about 50 mm. A coil can measure between about 0.5 mm and about 3 mm (e.g., between about 1.0 mm and about 1.5 mm) along a longitudinal axis (e.g., the z-axis in FIG. 2).

Figure 12:
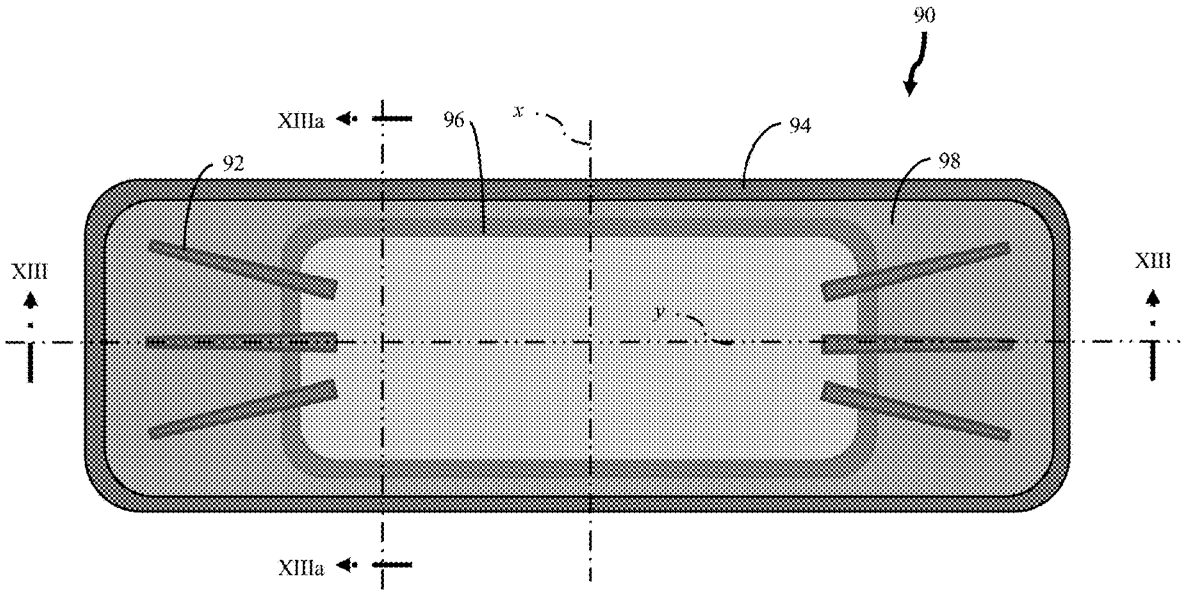
FIG. 12 illustrates a top-plan view from above a diaphragm having integrated stiffener members extending from an upper major surface.
Figure 13:
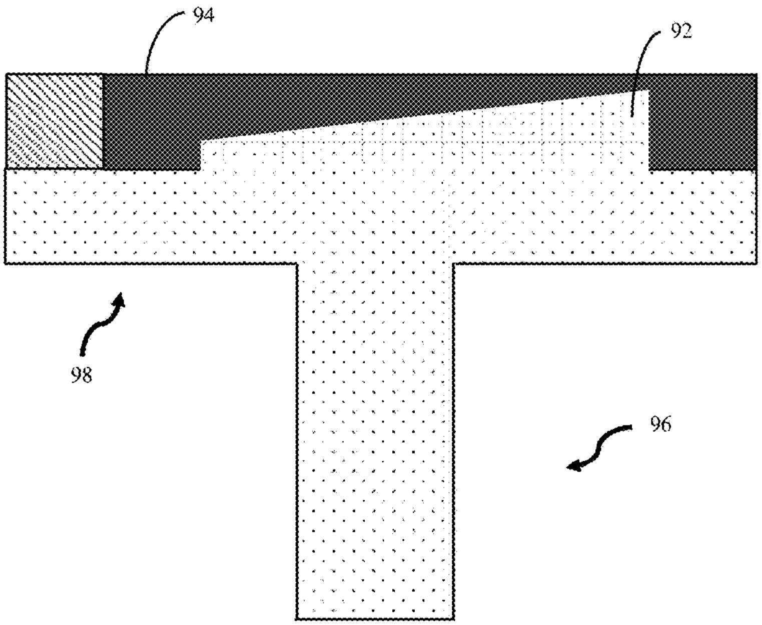
FIG. 13 illustrates a cross-sectional view of the diaphragm shown in FIG. 12 taken along section line XIII-XIII and to the left of section line XIIIa-XIIIa.

In general, the diaphragm 22 can define one or more protuberances or other features (e.g., recesses, apertures, etc.) extending from (or into or through) the first major surface 22*a* (as with a stiffening element 92 shown in FIG. 12), the second major surface 22*b* (as in FIG. 2), or both (as in FIG. 13). Each such feature can form a unitary construct with the respective diaphragm. As well, a diaphragm can define a recess or other depression (or aperture) in one or more regions of the first major surface 22*a*, the second major surface 22*b*, or both.

Such protrusions or recesses can be integrated into the diaphragm using, for example, an injection-molding or other forming process. The integrated features can provide one or more corresponding benefits lacking from the diaphragm 12 shown in FIG. 1, e.g., as described above. For example, one or more apertures (not shown) can extend through the diaphragm 22 from the first major surface to the second major surface and allow a barometric pressure to equalize across the diaphragm 22.

Referring now to FIG. 12, other examples of structural features that can be formed with a diaphragm as a unitary construct are described. As shown in FIG. 12, a diaphragm 90 can include one or more stiffening elements 92, e.g., a thickened region, a rib, or a strut. For example, such a stiffening element 92 can be incorporated in the diaphragm at a selected region to modify a resonant bending frequency (sometimes referred to as a break-up frequency) of the diaphragm, which can degrade fidelity of the loudspeaker transducer. Resonant bending frequency for a diaphragm 90 can depend on geometry of the diaphragm, material properties of the materials used to form the diaphragm, and how the diaphragm is supported (e.g., by a surround 94 overlying an outer periphery of the diaphragm) and a pedestal/drive element assembly 96 (e.g., as described in relation to FIGS. 2 through 8, above).

In FIG. 12, the acoustic diaphragm 90 defines an outer peripheral region 98 that extends outward of the pedestal/drive element assembly 96. At opposed end regions (e.g., along the major axis y), the diaphragm 90 defines respective cantilevered regions extending outwardly of the pedestal to the outer periphery (e.g., under the surround 94). A stiffener 92 extends along each cantilevered region toward the outer periphery 98. In some (e.g., injection-molded) diaphragms, the stiffener is integrally formed with the cantilevered region.

In FIG. 12, the stiffener is an elongate rib having a longitudinal axis. The rib defines a cross-sectional area that tapers along the longitudinal axis and toward the outer periphery 98. As shown in FIG. 13, the exemplary rib tapers in cross-sectional area both longitudinally (e.g., along the y-axis, as well as along the z-axis (FIG. 2). Incorporating such a stiffener 92 in a diaphragm 90 can modify a break-up frequency mode of the diaphragm 90, as by reinforcing (e.g., stiffening) a region subject to flexure, or buckling. However, even without incorporating a stiffener 92 as in FIG. 12, the integrated pedestal 96 (or pedestal 23 in FIG. 2) can modify a stiffness of the diaphragm 22. And, positioning the pedestal 23*b*, 23*c*, 23*d* (FIGS. 8, 9 and 10) at or near an outer peripheral edge 15*a* of the diaphragm 22 can eliminate or reduce a size of an outer peripheral region 98 shown in FIG. 12. Such an arrangement can modify a bending stiffness of the diaphragm and can modify a break up frequency thereof compared to the diaphragm shown in FIG. 2.

Figure 14:
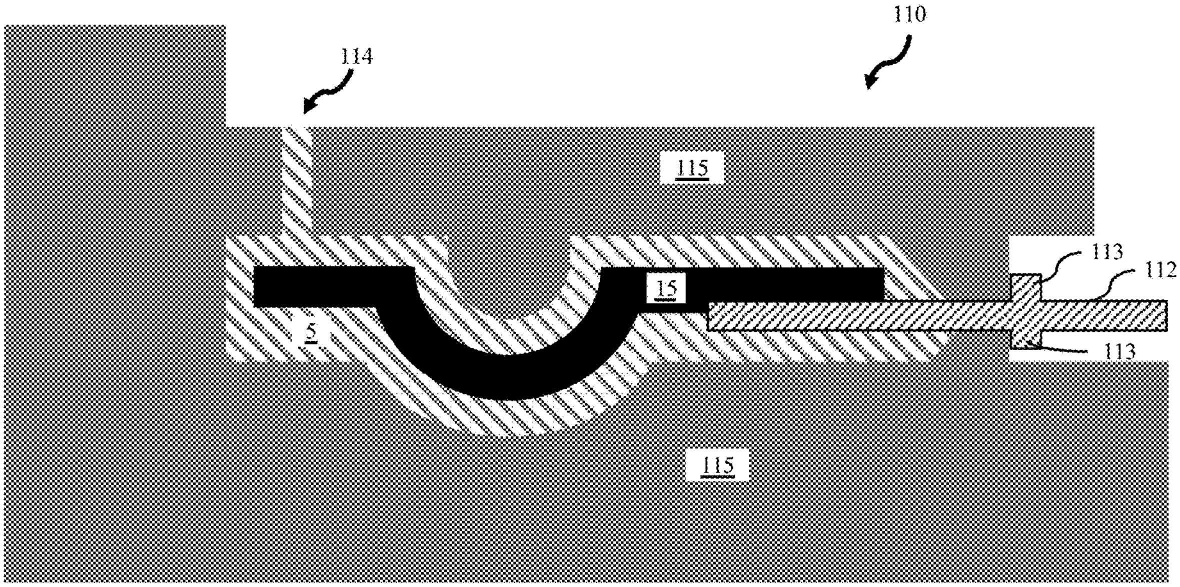
FIG. 14 schematically illustrates an intermediate construct during an over-molding process. A portion of a diaphragm has integrated structural features that can inhibit a flow of excess material and thus reduce so-called "flash" formation.

Some acoustic diaphragms described herein can include an over-molded layer of material. FIG. 14 shows an example of such a diaphragm. FIG. 14 shows an interim construct 110 during an over-molding process applied to a diaphragm 112 having integrated structural features, e.g., studs (or bosses) 113, as disclosed herein. A supply 114 of silicone 5 can be injected into an over-mold die 115, and the silicone can flow over and partially encapsulate the surround 15 and a portion of the diaphragm. The die 115 can define opposed jaws that contact the diaphragm 112 at positions between the surround 15 and the studs 113. Nonetheless, some silicone 5 can flow between the jaws and the diaphragm 112 (e.g., as the die wears over time). Such an unintentional deposit of material (e.g., of the silicone) arising from an over-molding process is sometimes referred to in the art as "flash." The bosses 113 can inhibit a flow of the silicone 5 past the bosses, and can reduce the extent of flash resulting from an over-molding process. Alternatively, the bosses 113 can be "crushed" by the die 115 into a surface of the diaphragm 112. According to another aspect, a recess or other depression (e.g., in addition to or as opposed to the bosses 113) in one or more regions of the diaphragm can receive an unintentional deposit of an adhesive or other material applied to the diaphragm.

Referring now to FIG. 15, the loudspeaker module 20 (FIG. 2) is positioned in an acoustic enclosure 1. The acoustic enclosure 1 can be a stand-alone apparatus, as in the case of, for example, a traditional bookshelf speaker or a smart speaker. Alternatively, the acoustic enclosure 1 can constitute a defined region within an encasement of a smaller, portable device, such as, for example, a smart phone. In still other alternative embodiments, the acoustic enclosure can constitute a portion of a smart watch, an in-ear earphone, on on-ear headphone, or an over-the-ear headphone.

In any event, the acoustic enclosure 1 in FIG. 15 includes a housing 2 defining an open interior region 3. The loudspeaker diaphragm 22, or more generally, the acoustic radiator, is positioned in the open interior region 3 and defines a first major surface 22*a* and an opposed second major surface 22*b*. In FIG. 15, the open interior region 3 defines an acoustic chamber 30 adjacent the first major surface 22*a* and an acoustically-sealed acoustic chamber 19 adjacent the second major surface 22*b*. In FIG. 15, the acoustic chamber 30 and the acoustically-sealed acoustic chamber 19 are at least partially bounded by the first major surface 22*a* and the second major surface 22*b*, respectively.

The housing 2 also defines an acoustic port 6 from the acoustic chamber 30 to a surrounding environment 7. The port 6 and diaphragm 22 can be arranged in a so-called "side firing" arrangement, as in FIG. 15. That is to say, a cross-section (or mouth) of the port 6 can be oriented transversely relative to a major surface 22*a*, 22*b* of the diaphragm 22. For example, in FIG. 15, the port 6 is oriented such that a vector normal to the mouth of the port extends orthogonally relative to a vector normal to the loudspeaker diaphragm 22.

Although the illustrated acoustic port 6 has a cover 8 or other protective barrier to inhibit intrusion of dirt, water, or other debris into the acoustic chamber 18, some acoustic ports have no distinct cover. For example, rather than defining a single aperture as in FIG. 15, the housing 2 can define a perforated wall (not shown) extending across the mouth of the port 6.

Although the acoustic port 6 is illustrated in FIG. 15 generally as being an aperture defined by the housing wall, in some instances, the acoustic port 6 includes an acoustic duct or channel extending from the acoustic chamber 18 to an outer surface 2*a* of the housing 2 or other encasement. For example, aesthetic or other design constraints for an electronic device may cause the acoustic chamber 18 to be spaced apart from the outer surface 2*a* of the housing or other encasement. Consequently, a duct or other acoustic channel (not shown) can extend from the acoustic chamber 18 to the outer surface to acoustically connect the acoustic chamber 18 to the surrounding environment 7. Although not shown, such a duct can have internal baffles to define a circuitous path from a proximal end adjacent the acoustic chamber 30 to a distal end adjacent the outer surface 2*a*.

Although a side-firing arrangement is shown, some disclosed loudspeaker enclosures are arranged for so-called direct firing. A direct firing enclosure directs the major surface of the loudspeaker diaphragm toward an opening in the enclosure. Even with a direct firing arrangement, the diaphragm may be spaced apart from an external surface of the enclosure and acoustically coupled with the external environment by way of a port and/or a channel, e.g., a circuitous channel. A mesh or other cover may extend over the diaphragm or port for aesthetic or reliability reasons (e.g., to inhibit intrusion of debris).

And, although not shown in FIG. 2 or FIG. 15, a loudspeaker transducer and/or an acoustic enclosure can include other circuitry (e.g., application-specific integrated circuits (ASICs)) or electrical devices (e.g., capacitors, inductors, and/or amplifiers) to condition and/or drive electrical signals through the voice coil. Such circuitry can constitute a portion of a computing environment or audio appliance described herein.

Figure 16:
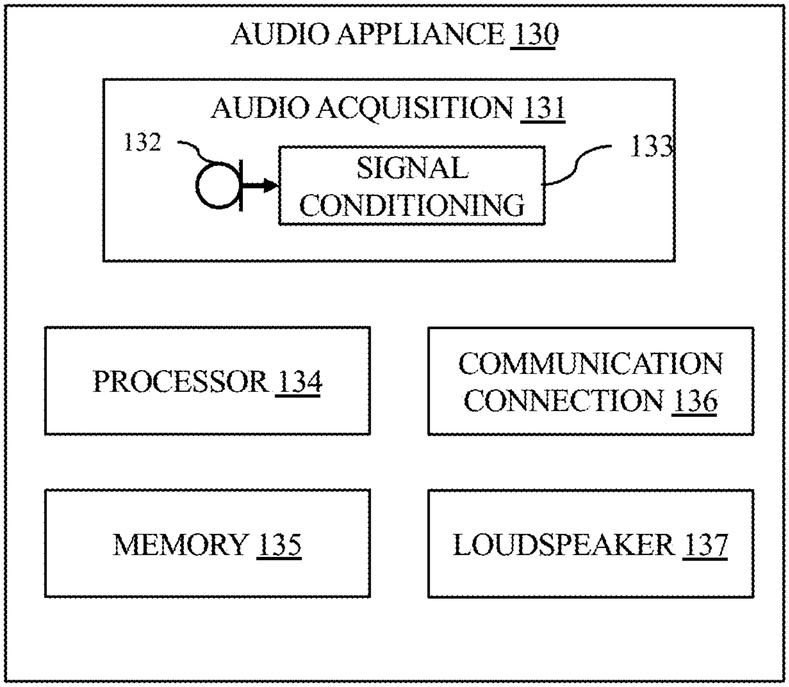
FIG. 16 illustrates a block diagram showing aspects of an audio appliance.

Referring now to FIG. 16, electronic devices incorporating disclosed electro-acoustic transducers are described by way of reference to a specific example of an audio appliance. Electronic devices represent but one possible class of computing environments which can incorporate a disclosed electro-acoustic transducer, as described herein. Nonetheless, electronic devices are succinctly described in relation to a particular audio appliance 130 to illustrate an example of a system incorporating and benefitting from disclosed electro-acoustic transducers.

As shown in FIG. 16, an audio appliance 130 or other electronic device can include, in its most basic form, a processor 134, a memory 135, and a loudspeaker or other electro-acoustic transducer 137, and associated circuitry (e.g., a signal bus, which is omitted from FIG. 16 for clarity).

The memory 135 can store instructions that, when executed by the processor 134, cause the circuitry in the audio appliance 130 to drive the electro-acoustic transducer 137 to emit sound over a selected frequency bandwidth. In addition, the audio appliance 130 can have a ported acoustic chamber positioned adjacent the electro-acoustic transducer as in FIG. 15.

The audio appliance 130 schematically illustrated in FIG. 16 also includes a communication connection 136, as to establish communication with another computing environment. As well, the audio appliance 130 includes an audio acquisition module 131 having a microphone transducer 132 to convert incident sound to an electrical signal, together with a signal conditioning module 133 to condition (e.g., sample, filter, and/or otherwise condition) the electrical signal emitted by the microphone. In addition, the memory 135 can store other instructions that, when executed by the processor, cause the audio appliance 130 to perform any of a variety of tasks akin to a general computing environment, such as a distributed computing environment, a network connected computing environment, and a stand alone computing environment.

An audio appliance can take the form of a portable media device suitable for use with a variety of accessory devices An accessory device can take the form of a wearable device, such as, for example, a smart-watch, an in-ear earbud, an on-ear earphone, and an over-the-ear earphone. An accessory device can include one or more electro-acoustic transducers as described herein.

IX. Other Embodiments

The previous description is provided to enable a person skilled in the art to make or use the disclosed principles. Embodiments other than those described above in detail are contemplated based on the principles disclosed herein, together with any attendant changes in configurations of the respective structures described herein, without departing from the spirit or scope of this disclosure.

The examples described above generally concern "small" electro-acoustic transducers, and related systems and methods. However, micro-speakers operate on principles similar to larger electro-acoustic transducers. Accordingly, concepts disclosed herein can be incorporated in electro-acoustic transducers other than micro-speakers.

Moreover, various modifications to the examples described herein will be readily apparent to those skilled in the art. For example, some disclosed pedestals formed in a loudspeaker diaphragm can substitute for a separate coil former (or bobbin). In such an embodiment, the pedestal can be used as a bobbin or other former to which voice-coil windings are applied when constructing the coil. With such an assembly, a separate layer of adhesive 21 can be omitted, as by joining the pedestal with the voice-coil wire concurrently with forming the coil windings (e.g., using a resin overlying the coil wire).

Directions and other relative references (e.g., up, down, top, bottom, left, right, rearward, forward, etc.) may be used to facilitate discussion of the drawings and principles herein, but are not intended to be limiting. For example, certain terms may be used such as "up," "down,", "upper," "lower," "horizontal," "vertical," "left," "right," and the like. Such terms are used, where applicable, to provide some clarity of description when dealing with relative relationships, particularly with respect to the illustrated embodiments. Such terms are not, however, intended to imply absolute relationships, positions, and/or orientations. For example, with respect to an object, an "upper" surface can become a "lower" surface simply by turning the object over. Nevertheless, it is still the same surface and the object remains the same. As used herein, "and/or" means "and" or "or", as well as "and" and "or." Moreover, all patent and non-patent literature cited herein is hereby incorporated by reference in its entirety for all purposes.

And, those of ordinary skill in the art will appreciate that the exemplary embodiments disclosed herein can be adapted to various configurations and/or uses without departing from the disclosed principles. Applying the principles disclosed herein, it is possible to provide a wide variety of damped acoustic enclosures, and related methods and systems. For example, the principles described above in connection with any particular example can be combined with the principles described in connection with another example described herein. Thus, all structural and functional equivalents to the features and method acts of the various embodiments described throughout the disclosure that are known or later come to be known to those of ordinary skill in the art are intended to be encompassed by the principles described and the features claimed herein. Accordingly, neither the claims nor this detailed description shall be construed in a limiting sense, and following a review of this disclosure, those of ordinary skill in the art will appreciate the wide variety of audio appliances, and related methods and systems that can be devised under disclosed and claimed concepts.

Moreover, nothing disclosed herein is intended to be dedicated to the public regardless of whether such disclosure is explicitly recited in the claims. To aid the Patent Office and any readers of any patent issued on this application in interpreting the claims appended hereto or otherwise presented throughout prosecution of this or any continuing patent application, applicants wish to note that they do not intend any claimed feature to be construed under or otherwise to invoke the provisions of 35 U.S.C. § 112(f), unless the phrase "means for" or "step for" is explicitly used in the particular claim.

The appended claims are not intended to be limited to the embodiments shown herein, but are to be accorded the full scope consistent with the language of the claims, wherein reference to a feature in the singular, such as by use of the article "a" or "an" is not intended to mean "one and only one" unless specifically so stated, but rather "one or more". Further, in view of the many possible embodiments to which the disclosed principles can be applied, I reserve to the right to claim any and all combinations of features and technologies described herein as understood by a person of ordinary skill in the art, including, for example, all that comes within the scope and spirit of the following claims.

What is claimed is:

1. An electro-acoustic transducer comprising:

a unitary member comprising:

an acoustic diaphragm and a pedestal integrally formed with the acoustic diaphragm, the acoustic diaphragm defining a first major surface and an opposed second major surface, wherein each of the first major surface and the opposed second major surface defines a corresponding major axis and a minor axis, with each respective major axis being longer than the corresponding minor axis, wherein the pedestal extends transversely from the second major surface, the acoustic diaphragm defining an outer periphery, and a stiffener integrally formed with the diaphragm and extending from the first major surface and along the acoustic diaphragm toward the outer periphery, the stiffener comprising an elongate rib having a longitudinal axis and defining a cross-sectional area that tapers along the longitudinal axis and toward the outer periphery.

2. The electro-acoustic transducer of claim 1, wherein the pedestal extends from the second major surface at a position adjacent the outer periphery.

3. The electro-acoustic transducer of claim 1, wherein the acoustic diaphragm defines a cantilevered region, and the stiffener is integrally formed with the cantilevered region.

4. The electro-acoustic transducer of claim 1, wherein the stiffener modifies a break-up frequency mode of the diaphragm.

5. The electro-acoustic transducer of claim 1, further comprising a drive element, wherein the drive element includes a coil having a first plurality of windings positioned adjacent to the acoustic diaphragm and a second plurality of windings positioned distally from the acoustic diaphragm.

6. The electro-acoustic transducer of claim 1, further comprising:

a drive element; and an adhesively bonded lap joint coupling the drive element to the pedestal of the unitary member.

7. The electro-acoustic transducer of claim 6, wherein the adhesively bonded lap joint comprises an adhesive that spans a gap between the pedestal and the drive element.

8. An electronic device, comprising:

an acoustic enclosure; and an electro-acoustic transducer disposed in the acoustic enclosure, the electro-acoustic transducer comprising:

a unitary member that includes an acoustic diaphragm and a pedestal integrally formed with the acoustic diaphragm, the acoustic diaphragm defining a first major surface and an opposed second major surface, wherein each of the first major surface and the opposed second major surface defines a corresponding major axis and a minor axis, with each respective major axis being longer than the corresponding minor axis, wherein the pedestal extends transversely from the second major surface, wherein:

the acoustic diaphragm defines an outer periphery, the unitary member further comprises a stiffener extending from the first major surface and along the acoustic diaphragm toward the outer periphery, the stiffener comprises an elongate rib having a longitudinal axis and defining a cross-sectional area, and the cross-sectional area tapers along the longitudinal axis and toward the outer periphery.

9. The electronic device of claim 8, wherein the pedestal extends from the second major surface at a position adjacent the outer periphery.

10. The electronic device of claim 8, wherein the stiffener is integrally formed with the acoustic diaphragm.

11. The electronic device of claim 8, wherein the stiffener modifies a break-up frequency mode of the acoustic diaphragm.

12. The electronic device of claim 8, further comprising a drive element, wherein the drive element includes a coil having a first plurality of windings positioned adjacent to the acoustic diaphragm and a second plurality of windings positioned distally from the acoustic diaphragm.

13. The electronic device of claim 8, wherein the electronic device is a standalone electronic device, and wherein the acoustic enclosure forms a housing of the standalone electronic device.

14. The electronic device of claim 13, wherein the electronic device comprises a wearable electronic device.

15. The electronic device of claim 8, further comprising:

a drive element; and an adhesively bonded lap joint coupling the drive element to the pedestal of the unitary member.

16. The electronic device of claim 15, wherein the adhesively bonded lap joint comprises an adhesive that spans a gap between the pedestal and the drive element.

17. A method of operating an electronic device, the method comprising:

providing a current to a drive element of an electro-acoustic transducer, the electro-acoustic transducer comprising a unitary member that includes an acoustic diaphragm and a pedestal integrally formed with the acoustic diaphragm, the acoustic diaphragm defining a first major surface and an opposed second major surface, wherein each of the first major surface and the opposed second major surface defines a corresponding major axis and a minor axis, with each respective major axis being longer than the corresponding minor axis, wherein the pedestal extends transversely from the second major surface, wherein the acoustic diaphragm defines an outer periphery;

integrally forming a stiffener with the acoustic diaphragm, wherein the stiffener extends from the first major surface and along the acoustic diaphragm toward the outer periphery, the stiffener comprising an elongate rib having a longitudinal axis and defining a cross-sectional area that tapers along the longitudinal axis and toward the outer periphery; and driving motion of the acoustic diaphragm with the drive element.

18. The method of claim 17, wherein the drive element comprises a voice coil and wherein providing the current to the drive element comprises passing the current through windings of the voice coil.

19. The method of claim 17, wherein driving the motion of the acoustic diaphragm with the drive element comprises driving the motion via an adhesively bonded lap joint coupling the drive element to the pedestal of the unitary member.

20. The method of claim 17, further comprising molding silicone over the acoustic diaphragm.

* * * * *